(12) United States Patent
Wang et al.

(10) Patent No.: US 9,049,268 B2
(45) Date of Patent: Jun. 2, 2015

(54) GLOBAL PROVISIONING OF MILLIONS OF USERS WITH DEPLOYMENT UNITS

(75) Inventors: Weidong Wang, Lexington, MA (US); Thomas D. Sanfilippo, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1938 days.

(21) Appl. No.: 11/418,687

(22) Filed: May 5, 2006

(65) Prior Publication Data
US 2007/0276900 A1    Nov. 29, 2007

(51) Int. Cl.
*H04M 3/42* (2006.01)
*H04L 29/12* (2006.01)
*G06Q 10/06* (2012.01)
*G06Q 10/10* (2012.01)

(52) U.S. Cl.
CPC .............. *H04L 61/60* (2013.01); *G06Q 10/06* (2013.01); *G06Q 10/10* (2013.01); *H04L 29/12122* (2013.01); *H04L 29/12792* (2013.01); *H04L 61/1547* (2013.01); *H04L 61/609* (2013.01)

(58) Field of Classification Search
CPC ... H04L 67/02; H04L 67/101; H04L 67/1027; H04L 67/1029; H04L 67/1002; H04L 67/1008; H04L 67/1021; H04L 67/2814; H04L 29/06; H04L 47/125; H04L 61/2514
USPC .................. 379/201.12, 221.08, 221.14, 242; 726/2; 3/201.12, 221.08, 221.14, 242; 370/254; 709/201, 202, 204–207, 709/217–229, 230, 231, 238–244; 455/404.2
See application file for complete search history.

(56) References Cited

U.S. PATENT DOCUMENTS

| | | | |
|---|---|---|---|
| 5,557,678 A * | 9/1996 | Ganesan ....................... | 380/282 |
| 6,668,272 B1 | 12/2003 | Keller et al. | |
| 6,782,352 B2 | 8/2004 | Wen et al. | |
| 6,799,214 B1 * | 9/2004 | Li ................................ | 709/226 |
| 6,898,435 B2 | 5/2005 | Milman | |
| 2001/0021646 A1 * | 9/2001 | Antonucci et al. ............ | 455/404 |
| 2002/0039411 A1 * | 4/2002 | Sabinson et al. ......... | 379/221.08 |

(Continued)

FOREIGN PATENT DOCUMENTS

| | | |
|---|---|---|
| CN | 1322315 A | 11/2001 |
| CN | 1435771 A | 8/2003 |

(Continued)

OTHER PUBLICATIONS

International Search Report PCT/US2007/010874, Date: Nov. 5, 2007, pp. 1-7.

(Continued)

*Primary Examiner* — Ahmad F Matar
*Assistant Examiner* — Jirapon Intavong
(74) *Attorney, Agent, or Firm* — Steve Crocker; Stein Dolan; Micky Minhas

(57) ABSTRACT

Described herein is technology for, among other things, global provisioning of a service. The technology involves a provisioning server obtaining location information for a client. The provisioning server determines an appropriate deployment unit, based on the location information, to which the client will be assigned. The provisioning server transmits assignment information for the appropriate deployment unit to the client. The client then communicatively couples to the assigned deployment unit and begins receiving the service from the deployment unit.

18 Claims, 7 Drawing Sheets

(56) References Cited

U.S. PATENT DOCUMENTS

| | | |
|---|---|---|
| 2002/0059622 A1 | 5/2002 | Grove et al. |
| 2002/0112155 A1* | 8/2002 | Martherus et al. ............ 713/155 |
| 2003/0027581 A1* | 2/2003 | Jokinen et al. ................ 455/456 |
| 2003/0079027 A1 | 4/2003 | Slocombe et al. |
| 2003/0126203 A1 | 7/2003 | Wen et al. |
| 2003/0174683 A1 | 9/2003 | Vegge |
| 2003/0195984 A1* | 10/2003 | Zisapel et al. ................ 709/238 |
| 2004/0083307 A1* | 4/2004 | Uysal ............................ 709/246 |
| 2004/0116131 A1 | 6/2004 | Hochrainer et al. |
| 2004/0122958 A1* | 6/2004 | Wardrop ....................... 709/229 |
| 2004/0192332 A1 | 9/2004 | Samn |
| 2004/0242240 A1 | 12/2004 | Lin |
| 2005/0021738 A1* | 1/2005 | Goeller et al. ................ 709/224 |
| 2007/0055674 A1* | 3/2007 | Sunada ........................... 707/10 |

FOREIGN PATENT DOCUMENTS

| | | | |
|---|---|---|---|
| JP | 2003256308 A | * | 9/2003 |
| JP | 2004086697 A | | 3/2004 |
| JP | 200639738 A | | 9/2006 |
| KR | 20020029441 A | | 4/2002 |
| WO | 9905584 A2 | | 2/1999 |
| WO | 9948009 A1 | | 9/1999 |
| WO | 0148622 A1 | | 7/2001 |
| WO | WO 0148622 A1 | * | 7/2001 |
| WO | 01/90911 A1 | | 11/2001 |
| WO | WO-2005125148 A1 | | 12/2005 |

OTHER PUBLICATIONS

"Web Server Director", http://www.netbriar.com/pdf/WSD.pdf.

Wong, Bernard, "ClosestNode.com: An Open•Access, Scalable, Shared Geocast Service for Distributed Systems", http://www.cs.cornell.edu/People/egs/papers/closestnode.pdf.

"Experiences on Grid Resource Selection Considering Resource Proximity", http://springerlink.metapress.com/(stelar55jguulezosaspmvnt)/app/home/contribution.asp?referrer.

Ratnasamy, Sylvia, "Topologically-Aware Overlay Construction and Server Selection", http://www.cs.umanitoba.ca/~maheswar/anc2002/PAPERS/RaH02.pdf.

Search Report for Taiwan Invention Patent Application No. 096115776, from the foreign language Office Action having a mailing date of Oct. 16, 2013, 1 page.

* cited by examiner

430

440

GLOBAL PROVISIONING OF MILLIONS OF USERS WITH DEPLOYMENT UNITS

BACKGROUND

Over the years, the internet has evolved from a simple means of publishing information to a resource-rich multimedia environment. Due to the proliferation of broadband technology in homes and business, opportunities have arisen for providing various types of services over the internet. Some of these services help to streamline global businesses. For example, one type of technology allows people working in offices on opposite sides of the globe to collaborate in a virtual office environment. Such services are generally hosted by one or more servers.

As demand for such services increases, it will become necessary to provide more servers to host the services. Moreover, if the service is provided globally, it may be desirable to scatter the servers to different geographic regions (e.g., one server in the U.S. and one server in Asia) in order to provide greater bandwidth to each respective region. Furthermore, if a region experiences a particularly heavy load, it may also be desirable to further sub-divide that region (e.g., a West Coast U.S. server, a Midwest U.S. server, and an East Coat U.S. server).

Thus, with servers scattered in different geographic locations, it will be desirable to provision the service in such a way that each user of the service is assigned to an appropriate server so that bandwidth and system performance can be optimized.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Described herein is technology for, among other things, global provisioning of a service. The technology involves a new client providing its location information to a provisioning server. The location information may include, but is not limited to, the client's regional ID and time zone. The provisioning server determines an appropriate deployment unit, based on the location information, to which the new client will be assigned. The provisioning server transmits assignment information for the appropriate deployment unit to the new client. The client then communicatively couples to the assigned deployment unit and begins receiving the service from the deployment unit.

In the event that, for any reason, it is desired that a particular client be reassigned from its current deployment unit to a new or different deployment unit, the current deployment unit transmits need-reassignment information to the client. The client, upon receiving the need-reassignment information, goes through the above steps to get provisioned to a different deployment unit. The client then communicatively couples with the new deployment unit as instructed in the reassignment information.

Thus, embodiments provide highly adaptable technology for globally provisioning a service. The technology is capable of intelligently assigning clients to appropriate (often the closest) deployment units for the purpose of receiving the service. Furthermore, embodiments allow for the dynamic addition or removal of a deployment unit by reassigning clients on the fly. Such architecture is ideal for supporting clients numbering in the millions.

BRIEF DESCRIPTION OF THE DRAWINGS

The accompanying drawings, which are incorporated in and form a part of this specification, illustrate embodiments and, together with the description, serve to explain their principles.

DETAILED DESCRIPTION

Figure 1:
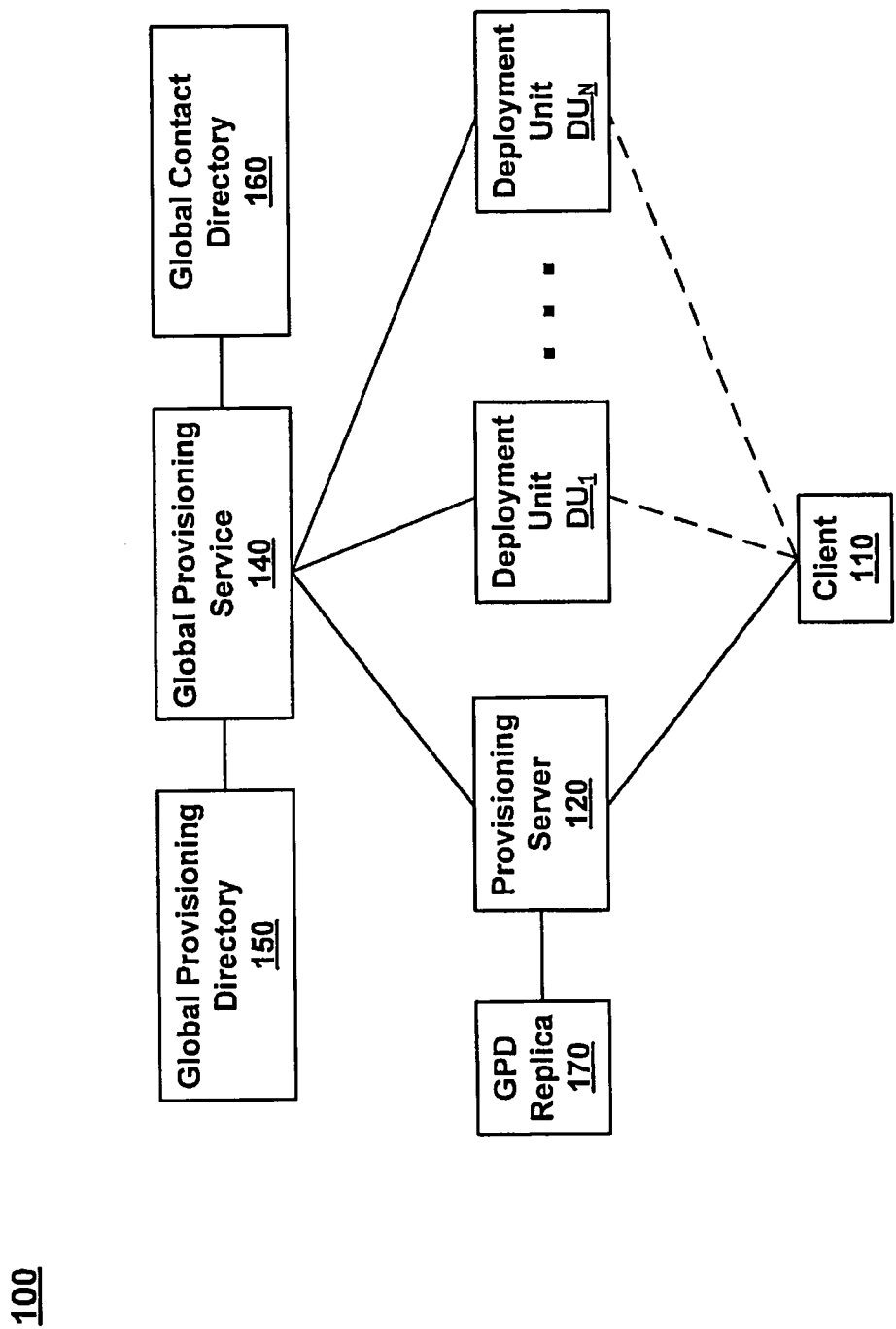
FIG. 1 is a block diagram illustrating a system for global provisioning of a service, in accordance with an embodiment.

Reference will now be made in detail to the preferred embodiments of the claimed subject matter, examples of which are illustrated in the accompanying drawings. While the invention will be described in conjunction with the preferred embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the claims. Furthermore, in the detailed description of the present invention, numerous specific details are set forth in order to provide a thorough understanding of the claimed subject matter. However, it will be obvious to one of ordinary skill in the art that the claimed subject matter may be practiced without these specific details. In other instances, well known methods, procedures, components, and circuits have not been described in detail as not to unnecessarily obscure aspects of the claimed subject matter.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the claimed subject matter.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Briefly stated, embodiments involve a provisioning server obtaining location information for a client. The provisioning server determines an appropriate deployment unit, based on the location information, to which the client will be assigned. The provisioning server transmits assignment information for the appropriate deployment unit to the client. The client then communicatively couples to the assigned deployment unit and begins receiving the service from the deployment unit.

FIG. 1 illustrates a system 100 for global provisioning of a service, in accordance with an embodiment. Although FIG. 1 depicts a hardware system, it should be appreciated that the embodiments described herein are well-suited for implementation in software, wherein the functions of components in FIG. 1 are performed by equivalent software modules on separate hardware systems.

The service provided by system 100 may be any service that is well-suited for global provisioning. In one embodiment, the service is a virtual office service. System 100 includes deployment units $DU_1$ to $DU_N$. In their most basic form, deployment units $DU_1$ to $DU_N$ provide the service to clients (such as client 110). System 100 also includes provisioning server 120. It should be appreciated that although only one provisioning server is depicted in FIG. 1, system 100 is well-suited to comprise multiple provisioning servers across geographical locations so as to appropriately handle the client-load.

In one embodiment, when an individual user is ready to create an account with the service, the client 110 will first connect to a provisioning server 120. At this point, the provisioning server 120 will obtain the client's location information. In one embodiment, the location information is obtained from the global network routing infrastructure. In another embodiment, the client 110 transmits its location information to the provisioning server 120. In yet another embodiment, the combination of client-sent location information and the location information obtained from the global network routing infrastructure is used. The location information may include, but is not limited to, a geographic ID, such as a country identifier, and the client's time zone. The location information may also include an account ID, an account certificate, a license type, and a transaction ID.

System 100 also includes a global provisioning service 140, which is communicatively coupled with provisioning servers like provisioning server 120 and a number of databases. Upon receiving the location information from the client 110, the provisioning server will contact the global provisioning service 140, which will in turn provide assignment information for the client 110. For example, if a client's geographic ID corresponds to the United States, and the client's time zone is Pacific Standard Time, the global provisioning service 140 will assign the client to a U.S. West Coast deployment unit. In one embodiment, each deployment unit may support only certain license types. For example, a U.S. East Coast deployment may support license types A and B, while a U.S. West Coast deployment unit only supports type A licenses. Thus, if the client from the previous example has a type B license, the global provisioning service would assign the client to the U.S. East Coast deployment unit because the U.S. West Coast deployment unit does not support the client's license. The assignment information provided by the global provisioning server 140 may include, but is not limited to a URL corresponding to the assigned deployment unit, a certificate corresponding to the assigned deployment unit, an authorization token, and a hash code.

In one embodiment, the databases to which the global provisioning service is coupled include a global provisioning directory (GPD) 150, which hosts information about deployment units $DU_1$-$DU_N$. This information may include, but is not limited to, the deployment units' names and locations, URLs and certificates corresponding to the deployment units, the deployment units' user capacity information, the types of licenses supported by the deployment units, etc.

Once the provisioning server 120 receives the assignment information from the global provisioning service 140 it will in turn relay the assignment information back to the client 110. In response, the client 110 will then communicatively couple with the deployment unit indicated in the assignment information (e.g., $DU_1$). Once the client 110 is coupled with its respective deployment unit (e.g., $DU_1$), it can then begin receiving the service from that deployment unit.

In one embodiment, the databases to which the global provisioning service is coupled include a global contact directory 160, which hosts contact information for users of the system 100. In one embodiment, the global contact directory is an opt-in feature. Thus, users (e.g., client 110) may elect to publish certain contact information to the global contact directory 160. The contact information stored in the global contact directory 160 may include, but is not limited to, names, email addresses, vCards, phone numbers, etc. Because publication to the global contact directory may be optional, the publication may occur at any time. For example, client 110 may publish its contact information via the provisioning server 120 when it is requesting the assignment information. Alternatively, client 110 may publish its contact information via its respective deployment unit (e.g., $DU_1$) after it has received its deployment unit assignment.

In one embodiment, system 100 includes a GPD replica 170 communicatively coupled with the provisioning server 120. Ideally, the GPD replica 170 is proximately located to the provisioning server 120. The benefit of having the GPD replica 170 is that provisioning server 120 can make the provisioning decision itself based on the information in the GPD replica 170, rather than obtaining the assignment information from the global provisioning service 140. This shortens the amount of time necessary to provision a client and reduces the bandwidth usage of the global provisioning service 140. If each provisioning server in system 100 (such as provisioning server 120) is coupled with a respective GPD replica (such as GPD replica 170), the global provisioning service 140 then only needs be concerned with managing modifications and queries to the global contact directory and periodically synchronizing the GPD replicas (such as GPD replica 170) with the original GPD 150.

As the number of clients accessing the service in a particular region (e.g., the United States) increases, it may be necessary to add one or more new deployment units (e.g., $DU_{N+1}$, $DU_{N+2}$, etc., not shown) to the system 100. For example, if the United States currently has a West Coast and an East Coast deployment unit, both of which are approaching their capacity limits, system 100 will then allow for the dynamic addition of, for instance, a Midwest deployment unit. Once the new deployment unit is in place and operational, it is desirable to reassign some clients to the new deployment unit in order to distribute the load more evenly. Re-provisioning clients to new or different deployment units may be desirable in other situations as well, such as reassigning a client if it is moved from one region to another or moving a particular class of users (e.g., beta users) to a particular deployment unit (e.g., for dedicated beta testing). If there are specific deployment units for those clients to be moved to, the deployment unit will mark in the global database for those clients. In such cases, the deployment units will transmit the need-reassignment information to the clients. Upon receiving the need-reassignment information, the clients will go through the same provisioning steps by contacting a provisioning server. If a client has moved, due to its location change, it will now be assigned to a different deployment unit closer to it. If the corresponding record in the global database has been marked, the client will be assigned to a pre-assigned deployment unit. The reassigned clients will then reconnect to the appropriate deployment unit. It should be appreciated that similar functions may be employed in the event that a deployment unit is removed from system 100.

Figure 2:
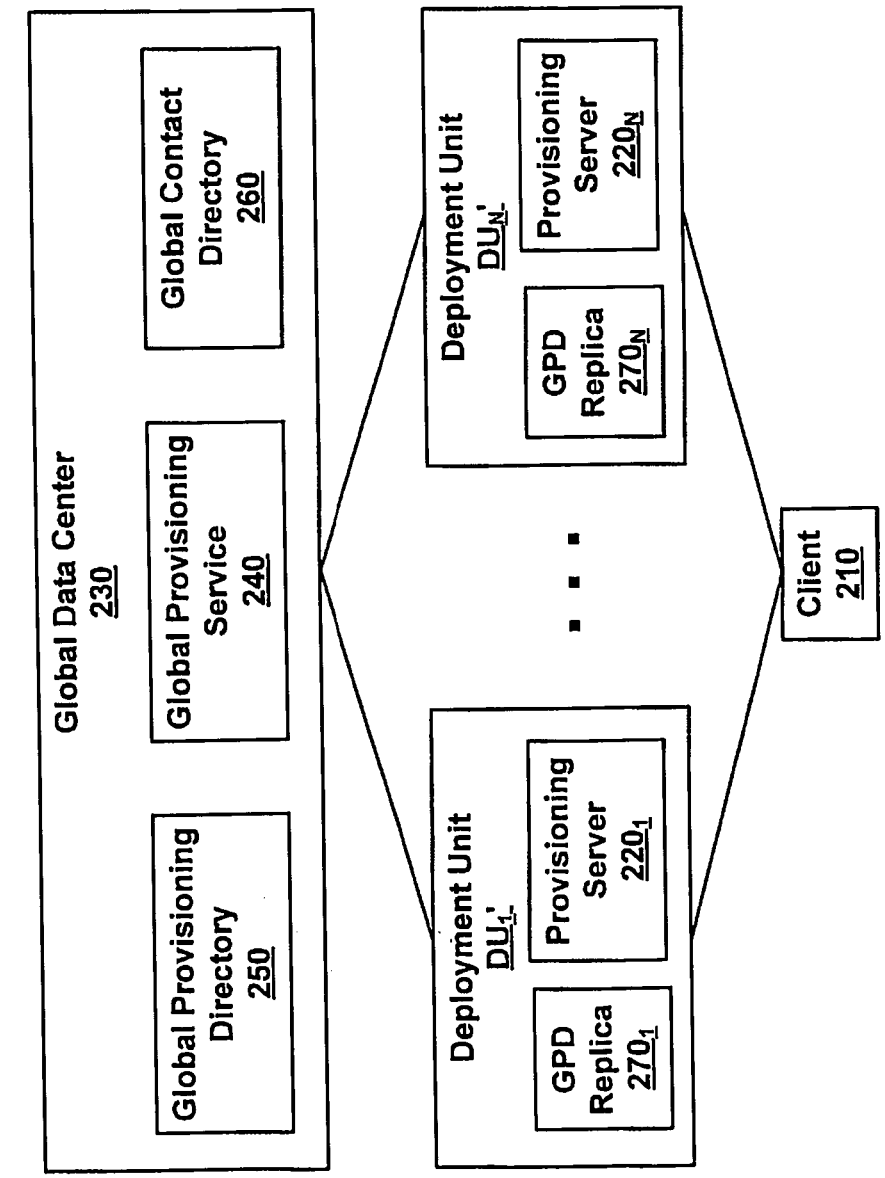
FIG. 2 is a block diagram illustrating a system for global provisioning of a service, in accordance with an exemplary embodiment.

FIG. 2 illustrates a system 200 for global provisioning of a service, in accordance with an exemplary embodiment. Although FIG. 1 depicts a hardware system, it should be appreciated that the embodiments described herein are well-suited for implementation in software, wherein the functions of components in FIG. 1 are performed by equivalent software modules.

In system 200, provisioning servers $220_1$-$220_N$ and GPD replicas $270_1$-$270_N$ are integrated within respective deployment units $DU_1'$ and $DU_N'$. Moreover, global provisioning service 240, GPD 250, and global contact directory 260 are integrated within a global data center 230. Functionally, system 200 operates similar to system 100.

In one embodiment, when an individual user is ready to create an account with the service, the client 210 will first connect to a provisioning server (e.g., $220_1$), which is integrated within a respective deployment unit (e.g., $DU_1'$). In one embodiment, the provisioning servers have a well-known name or alias (e.g., provision.groove.microsoft.com), which is built into client 210. The provisioning server (e.g., $220_1$) will obtain the client's location information. In one embodiment, the location information is obtained from the global network routing infrastructure. In another embodiment, the client 210 transmits its location information to the provisioning server (e.g., $220_1$). In yet another embodiment, the combination of client-sent location information and the location information obtained from the global network routing infrastructure is used. The location information may include, but is not limited to, a geographic ID, such as a country identifier, and the client's time zone. The location information may also include an account ID, an account certificate, a license type, and a transaction ID.

Upon receiving the location information from the client 210, the provisioning server (e.g., $220_1$) will contact the global provisioning service 240, which is integrated within the global data center 230. The global provisioning service 240 will in turn provide assignment information for the client 210. The assignment information provided by the global provisioning server 240 may include, but is not limited to a URL corresponding to the assigned deployment unit (e.g., $DU_N'$), a certificate corresponding to the assigned deployment unit, an authorization token, and a hash code.

In one embodiment, GPD 250 integrated within global data center 230 hosts information about deployment units $DU_1'$-$DU_N'$. This information may include, but is not limited to, the deployment units' names and locations, URLs and certificates corresponding to the deployment units, the deployment units' user capacity information, the types of licenses supported by the deployment units, etc.

Once the provisioning server (e.g., $220_1$) receives the assignment information from the global provisioning service 240 it will in turn relay the assignment information back to the client 210. In response, the client 210 will then communicatively couple with the deployment unit indicated in the assignment information (e.g., $DU_N'$). Once the client 210 is coupled with its assigned deployment unit (e.g., $DU_N'$), it can then begin receiving the service from that deployment unit. As shown, it is entirely possible in system 200 that the deployment unit to which client 210 is assigned (e.g., $DU_N'$) is a different deployment unit that the one that the assignment information was originally received from (e.g. $DU_1'$).

In one embodiment, global contact directory 260 integrated within global data center 230 hosts contact information for users of the system 200. In one embodiment, the global contact directory is an opt-in feature. Thus, users (e.g., client 210) may elect to publish certain contact information to the global contact directory 260. The contact information stored in the global contact directory 260 may include, but is not limited to, names, email addresses, vCards, phone numbers, etc. Because publication to the global contact directory may be optional, the publication may occur at any time. For example, client 210 may publish its contact information via the initial deployment unit (e.g., $DU_1'$) when it is requesting the assignment information. Alternatively, client 210 may publish its contact information via its assigned deployment unit (e.g., $DU_N'$) after it has received its deployment unit assignment.

GPD replicas $270_1$-$270_N$ integrated within respective deployment units $DU_1'$-$DU_N'$ allow their respective provisioning servers $220_1$-$220_N$ to make provisioning decisions themselves based on the information in the GPD replicas $270_1$-$270_N$, rather than obtaining the assignment information from the global provisioning service 240. This shortens the amount of time necessary to provision a client and reduces the bandwidth usage of the global provisioning service 240. By incorporating the GPD replicas $270_1$-$270_N$ into the deployment units $DU_1'$-$DU_N'$, the processing load on the global provisioning service 240 is greatly reduced. As such, the global provisioning service 240 then only needs be concerned with managing modifications and queries to the global contact directory 260 and periodically synchronizing the GPD replicas $270_1$-$270_N$ with the original GPD 250.

In one embodiment, system 200 is capable of reprovisioning a client (such as client 210). Scenarios in which reprovisioning of a user may be desirable or necessary include, but are not limited to, reassigning users after the addition or removal of a deployment unit from system 200, reassigning a client if it is moved from one region to another, or moving a particular class of users (e.g., beta users) to a particular deployment unit (e.g., for dedicated beta testing). In such cases, the deployment units will obtain new assignment information for the clients that are to be re-provisioned and subsequently transmit the new assignment information to the clients. The reassigned clients will then reconnect to the appropriate deployment unit.

Figure 3:
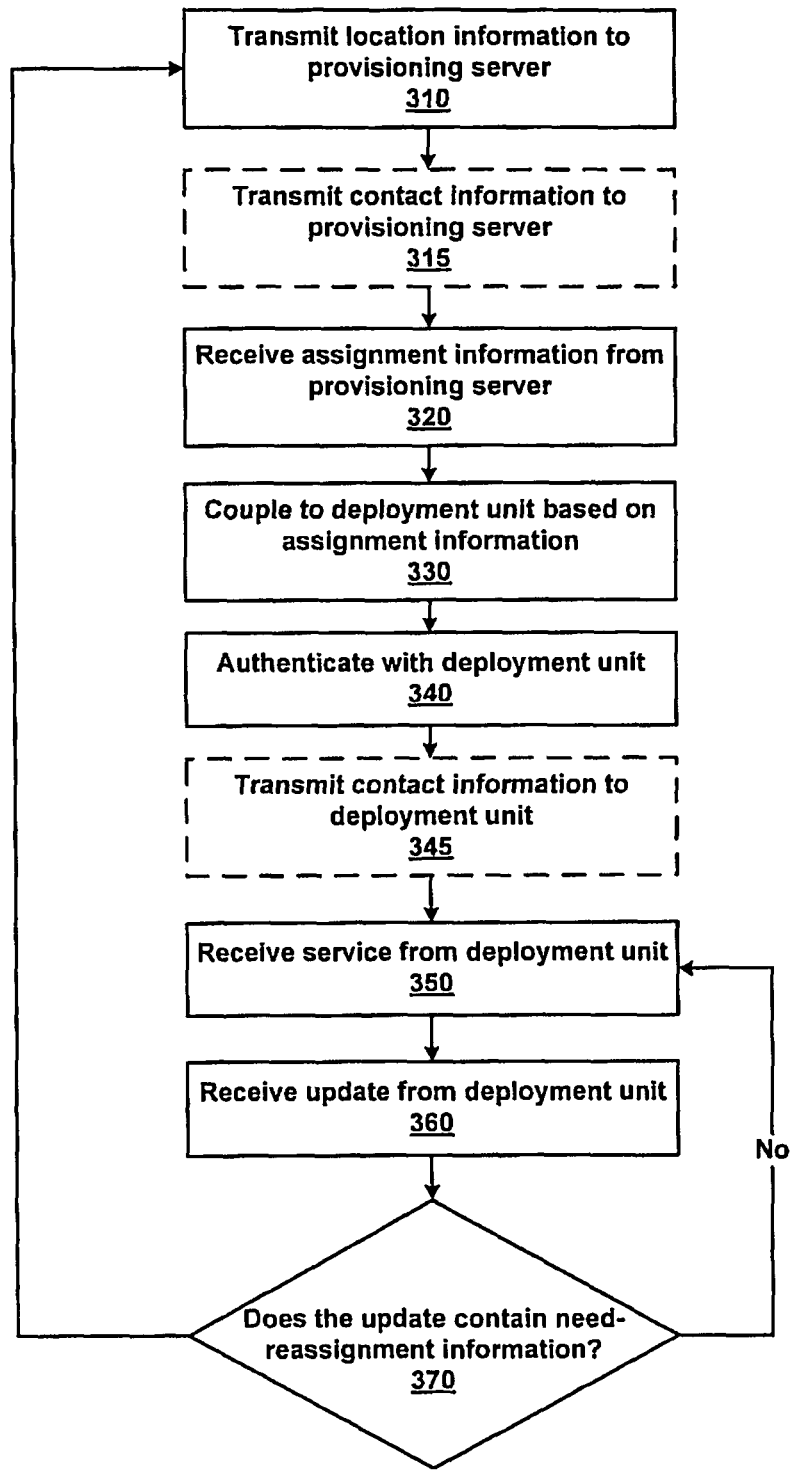
FIG. 3 is a flowchart illustrating a process for receiving global provisioning of a service in a client, in accordance with an embodiment.

FIG. 3 illustrates a process 300 for receiving global provisioning of a service in a client, in accordance with an embodiment. It should be appreciated that some embodiments may not utilize all steps depicted in FIG. 3. It should be further appreciated that some embodiments may include additional steps not depicted in FIG. 3. Steps of process 300 may be stored as instructions on a computer readable medium and executed on a computer processor.

Step 310 of process 300 involves transmitting location information to a provisioning server. The location information may include, but is not limited to, a geographic ID, such as a country identifier, and the client's time zone. The location information may also include an account ID, an account certificate, a license type, and a transaction ID.

Step 320 involves receiving assignment information from the provisioning server. The assignment information assigns the client to a particular deployment unit. The assignment information is at least in part based on the location information and may include, but is not limited to, a URL corresponding to the assigned deployment unit, a certificate corresponding to the assigned deployment unit, an authorization token, and a hash code. At step 330, the client communicatively couples to the assigned deployment unit. At step 340, the client authenticates with the deployment unit. The authentication step may include, but is not limited to, transmitting the account ID, account certificate, transaction ID, the authentication token, and the URL corresponding to the provisioning server to the deployment unit for verification. Once the client is authenticated, it may begin receiving the service (step 350) and periodic updates (step 360) from the deployment unit.

Steps 315 and 345 involve transmitting the clients contact information for inclusion in the global contact directory. These two blocks illustrate that the contact information may be submitted at various points in process 300. Moreover, it should be appreciated that the contact information may be submitted at other points in process 300 not shown in FIG. 3. In one embodiment, publishing the contact information to the global contact directory is an opt-in feature on a per-client basis.

As stated above, certain situations may arise where it becomes necessary to reassign a particular client to a different deployment unit. Reassignment information, if any, is included in the update received by the client at step 360. At step 370, process 300 determines if the update contains need-reassignment information. If not, process 300 continues normal operation and returns to step 350. If the update does contain need-reassignment information, process 300 returns to step 310 where the client 110 will go through the same provisioning steps to get assigned and communicatively couple with a new deployment unit.

Figure 4A:
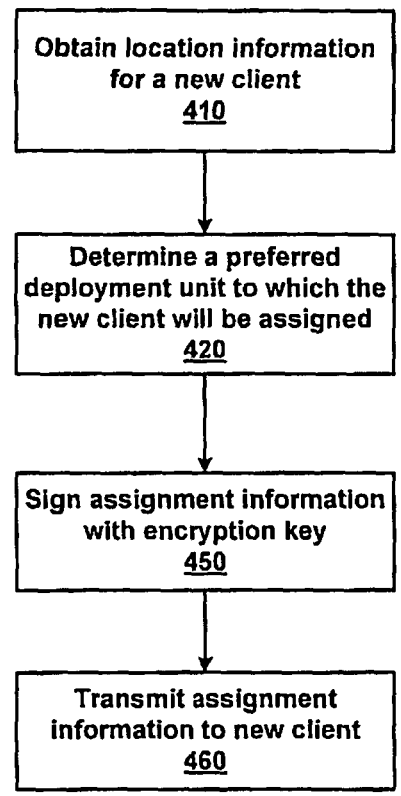
FIG. 4A is a flowchart illustrating a process for global provisioning of a service, in accordance with an embodiment.

FIG. 4A illustrates a process 400 for global provisioning of a service, in accordance with an embodiment. It should be appreciated that some embodiments may not utilize all steps depicted in FIG. 4A. It should be further appreciated that some embodiments may include additional steps not depicted in FIG. 4A. Steps of process 400 may be stored as instructions on a computer readable medium and executed on a computer processor.

Process 400 begins at step 410 by obtaining location information for a client. The location information may be obtained in a number of ways, such as directly from the client, through the global network routing infrastructure, a combination of the two, etc. The location information may include, but is not limited to, a geographic ID, such as a country identifier, and the client's time zone. The location information may also include an account ID, an account certificate, a license type, and a transaction ID.

Figure 4B:
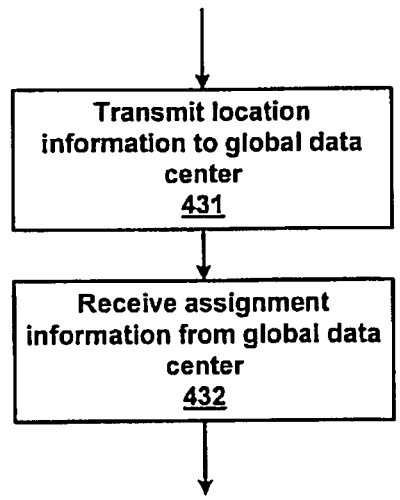
FIG. 4B is a flowchart illustrating a process for determining a preferred deployment unit to which a new client will be assigned, in accordance with an embodiment.
Figure 4C:
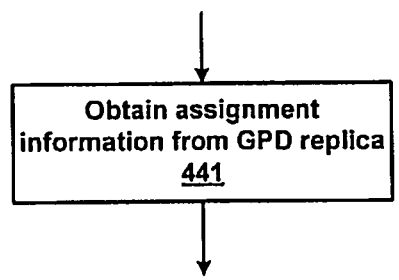
FIG. 4C is a flowchart illustrating a process for determining a preferred deployment unit to which a new client will be assigned when a GPD replica is coupled with the device utilizing the process, in accordance with an embodiment.

At step 420, a preferred deployment unit to which the client will be assigned is determined. Step 420 may be achieved in many ways. FIG. 4B illustrates a process 430 for determining a preferred deployment unit to which the client will be assigned, in accordance with an embodiment. At step 431 of process 430, the location information of the client is transmitted to the global data center. At step 432, assignment information is received from the global data center. The assignment information assigns the client to a particular deployment unit. The assignment information is at least in part based on the location information and may include, but is not limited to, a URL corresponding to the assigned deployment unit, a certificate corresponding to the assigned deployment unit, an authorization token, and a hash code. FIG. 4C illustrates a process 440 for determining a preferred deployment unit to which the client will be assigned when a GPD replica is coupled with the device utilizing processes 400 and 440, in accordance with an embodiment. At step 441, the assignment information is obtained from the GPD replica.

From step 420, process 400 next proceeds to step 450, where the assignment information is signed with an encryption key. The assignment information is then transmitted to the client (step 460).

Figure 4D:
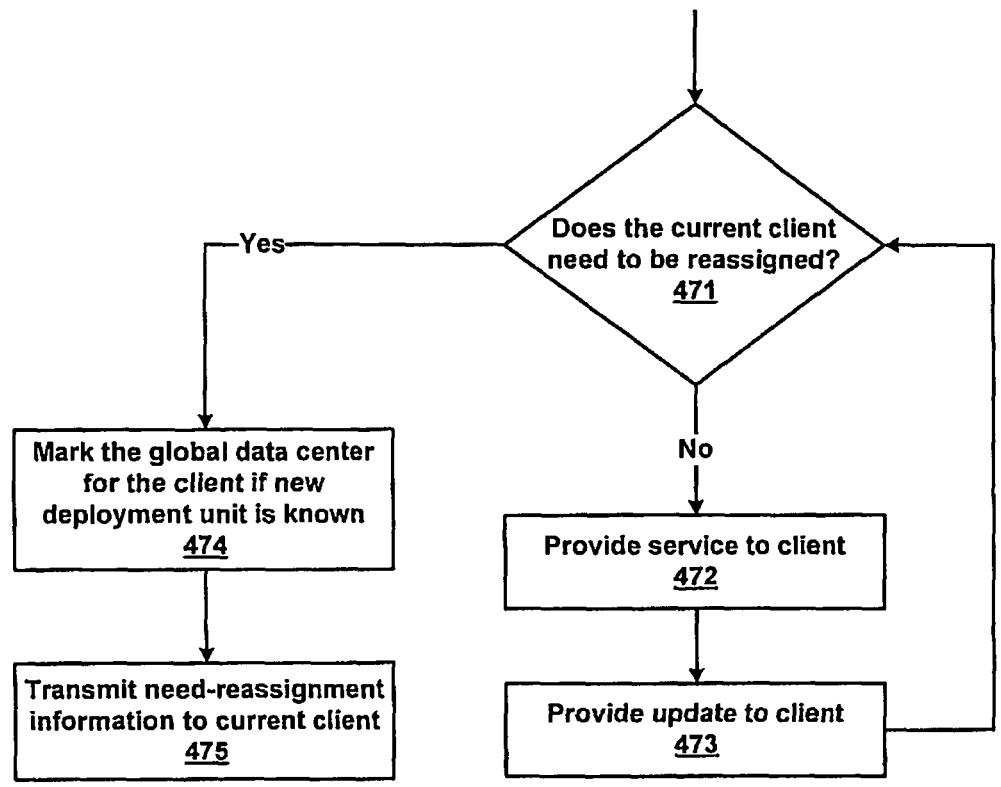
FIG. 4D is a flowchart illustrating a process for reassigning a current client to a new deployment unit, in accordance with an embodiment.

In one embodiment, the device utilizing process 400 may itself be a deployment unit and thus providing the service to other current clients. As stated above, certain situations may arise where it becomes necessary to reassign a particular current client to a different deployment unit. FIG. 4D illustrates a process 470 for reassigning a current client to a new deployment unit, in accordance with an embodiment. It should be appreciated that some embodiments may not utilize all steps depicted in FIG. 4D. It should be further appreciated that some embodiments may include additional steps not depicted in FIG. 4D. Steps of process 470 may be stored as instructions on a computer readable medium and executed on a computer processor.

At step 471, a determination is made as to whether a current client needs to be reassigned to a new deployment unit. This determination may be completely internal to the current deployment unit (e.g., the deployment unit has reached maximum capacity) or it may be the result of external variables (e.g., an instruction received from the global data center requiring the current client to be reassigned). If the current client does not need to be reassigned, the current deployment unit continues normal operations with respect to the current client and provides the service (step 472) and periodic updates (step 473) to the current client. If the current client does need to be reassigned, process 470 proceeds to step 474 where the global data center is marked for the current client if the new deployment unit is already known. At step 475, the need-reassignment information is provided to the current client, effectively causing the current client to go through the same provisioning steps to get assigned to a new deployment unit. The assignment information may be provided to the current client in a number of ways. For example, the assignment information may be provided to the current client in an update similar to the one transmitted to the client in step 473.

Figure 5:
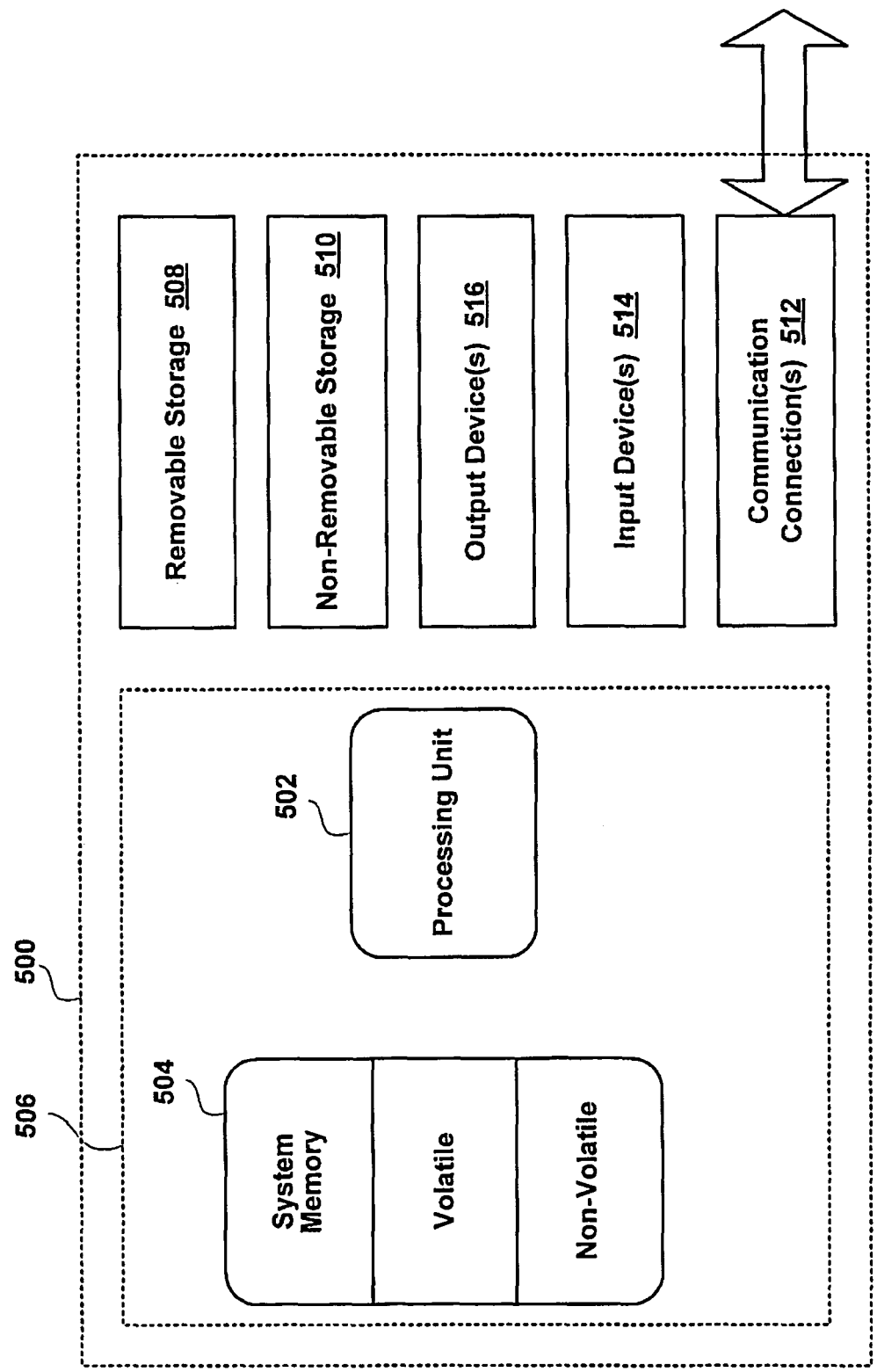
FIG. 5 is a diagram of an example of a suitable computing system environment on which embodiments may be implemented.

FIG. 5 illustrates an example of a suitable computing system environment 500 on which embodiments may be implemented. The computing system environment 500 is only one example of a suitable computing environment and is not intended to suggest any limitation as to the scope or functionality of the invention. Neither should be computing environment 500 be interpreted as having any dependency or requirement relating to any one or combination of components illustrated in the exemplary operating environment 500.

With reference to FIG. 5, an exemplary system for implementing embodiments includes a general purpose computing system environment, such as computing system environment 500. In its most basic configuration, computing system environment 500 typically includes at least one processing unit 502 and memory 504. Depending on the exact configuration and type of computing system environment, memory 504 may be volatile (such as RAM), non-volatile (such as ROM, flash memory, etc.) or some combination of the two. This most basic configuration is illustrated in FIG. 5 by dashed line 505. Additionally, computing system environment 500 may also have additional features/functionality. For example, computing system environment 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and nonremovable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 500. Any such computer storage media may be part of computing system environment 500.

Computing system environment 500 may also contain communications connection(s) 512 that allow it to communicate with other devices. Communications connection(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. Computing system environment 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

Thus, embodiments provide highly adaptable technology for globally provisioning a service. The technology is capable of intelligently assigning clients to appropriate (often the closest) deployment units for the purpose of receiving the service. Furthermore, embodiments allow for the dynamic addition or removal of a deployment unit by reassigning clients on the fly. Such architecture is ideal for supporting clients numbering in the millions.

The previous description of the disclosed embodiments is provided to enable any person skilled in the art to make or use the claimed subject matter. Various modifications to these embodiments will be readily apparent to those skilled in the art, and the generic principles defined herein may be applied to other embodiments without departing from the spirit or scope of the claimed subject matter. Thus, the claimed subject matter is not intended to be limited to the embodiments shown herein but is to be accorded the widest scope consistent with the principles and novel features disclosed herein.

What is claimed is:

1. A system for service to a client comprising:
   a plurality of deployment units, the deployment units configured to provide hosting for the service to clients, wherein the deployment units and the clients are distributed over different global geographic regions that include at least one of a plurality of different countries, a plurality of different time zones, or a plurality of different coastal or interior regions of a continent;
   a provisioning server configured to obtain global region location information for new clients each associated with respective different global geographic regions and to determine a deployment unit in an appropriate one of the associated with a respective one of the different global geographical regions, based on the global region location information, to which the clients will be assigned, the provisioning server also configured to transmit assignment information for at least an initial deployment of the new clients based on the global region location information to the clients, wherein the assignment information comprises a deployment unit assignment, and wherein further the clients are communicatively added or removed from particular geographically appropriate deployment units based on the deployment unit assignments associated with the global region location information for the respective clients provided by the provisioning server, to assign clients to different deployment units on-the-fly, to distribute a global client load geographically over the global deployment units of the different global geographic regions;
   a global provisioning service communicatively coupled to the provisioning server and databases, which databases comprise a global provisioning directory, and a replica of the global provisioning directory communicatively coupled to the provisioning server, the replica of the global provisioning directory is configured to periodically synchronize with the global provisioning directory, the provisioning server is configured to access the replica of the global provisioning directory or the global provisioning directory, wherein the global provisioning service receives the location information from the provisioning server and uses the location information and the databases to determine the assignment information; and
   a processor configured to execute computer-executable instructions in a memory, the instructions executed to enable at least one of a deployment unit, the provisioning server, or the global provisioning service.

2. The system as recited in claim 1 wherein further the global provisioning service provides the assignment information to the provisioning server.

3. The system as recited in claim 2 wherein the provisioning server is further configured to receive contact information from the clients and provide the contact information to the global provisioning service, and wherein the databases comprise:
   the global contact directory communicatively coupled to the global provisioning service, the global contact directory hosting the contact information.

4. The system as recited in claim 2 wherein the databases comprise:
the global provisioning directory communicatively coupled to the global provisioning service, the global provisioning directory hosting all known deployment units.

5. The system as recited in claim 4 wherein the provisioning server is configured to optionally access the replica of the global provisioning directory to determine the assignment information rather than via the global provisioning service.

6. The system as recited in claim 5 comprising a plurality of provisioning servers and a plurality of replicas of the global provisioning directory, wherein the provisioning servers and the replicas of the global provisioning directory are integrated within respective deployment units.

7. The system as recited in claim 1 wherein the provisioning server obtains the location information from the clients and the location information comprises a geographical ID and a time zone.

8. The system as recited in claim 1 wherein the provisioning server obtains the location information from a global network routing infrastructure.

9. A method of receiving global provisioning of a service in a new client comprising acts of:
transmitting global region location information of the new client to a provisioning server, wherein the new client is one of a plurality of clients distributed over different global geographic regions that include at least one of a plurality of different countries, a plurality of different time zones, or a plurality of different coastal or interior regions of a continent;
receiving assignment information from the provisioning server to determine a deployment unit for at least an initial deployment in an appropriate one of the different geographical regions for hosting the new client, based on the global region location information, to which the clients will be assigned, wherein the deployment unit is one of a plurality of deployment units distributed over the different global geographic regions, wherein the assignment information assigns the new client to a particular geographically appropriate deployment unit based on the location;
communicatively coupling a global provisioning service to the provisioning server and databases, which databases comprise a global provisioning directory, and a replica of the global provisioning directory communicatively coupled to the provisioning server, the replica of the global provisioning directory is configured to periodically synchronize with the global provisioning directory, the provisioning server is configured to access the replica of the global provisioning directory or the global provisioning directory, wherein the global provisioning service receives the global region location information from the provisioning server and uses the global region location information and the databases to determine the assignment information;
communicatively coupling the new client with the particular geographically appropriate deployment unit, wherein the deployment unit provides the service to the new client;
assigning other clients distributed over the different global geographic regions to different geographically appropriate deployment units on the fly, for dynamically distributing a global client load geographically; and
configuring a processor to execute instructions stored in a memory, the instructions executed to enable the acts of transmitting, receiving, communicatively coupling the global provisioning service, communicatively coupling the new client, and assigning.

10. The method as recited in claim 9 wherein the location information comprises an account ID, an account certificate, a license type, a transaction ID, and a time zone.

11. The method as recited in claim 9 wherein the assignment information comprises a URL corresponding to the particular deployment unit, a first certificate corresponding to the particular deployment unit, an authorization token, and a hash code.

12. The method as recited in claim 11 wherein the authorization token comprises the name of the provisioning server.

13. The method as recited in claim 11 wherein the hash code comprises a hash of the account ID, transaction ID, the URL corresponding to the particular deployment unit, a URL corresponding to the provisioning server, and a second certificate corresponding to the provisioning server.

14. A method of global provisioning of a service comprising acts of:
obtaining global region location information for a new client, wherein the new client is one of a plurality of clients distributed over different global geographic regions that include at least one of a plurality of different countries, a plurality of different time zones, or a plurality of different coastal or interior regions of a continent;
determining a preferred deployment unit for at least an initial deployment in an appropriate geographical region for hosting the new client, to which the new client will be assigned based in part on the global region location information, wherein the deployment units are distributed over the different global geographic regions;
providing a global provisioning service in communication with a provisioning server and databases, which databases comprise a global provisioning directory, and a replica of the global provisioning directory communicatively coupled to the provisioning server, the replica of the global provisioning directory is configured to periodically synchronize with the global provisioning directory, the provisioning server is configured to access the replica of the global provisioning directory or the global provisioning directory, wherein the global provisioning service receives the global region location information from the provisioning server and uses the global region location information and the databases to determine the assignment information;
assigning the new client and other clients as distributed over the different global geographic regions to different deployment units on the fly and thereby geographically distributing a global client load over the different global geographic regions;
transmitting assignment information regarding the preferred deployment unit to the new client, wherein the new client communicatively couples to the preferred deployment unit for hosting the new client upon receiving the assignment information in order to receive the service from the preferred deployment unit; and
configuring a processor to execute instructions stored in a memory, the instructions executed to enable the acts of obtaining, determining, providing, assigning, and transmitting.

15. The method as recited in claim 14 further comprising:
signing the assignment information with an encryption key before transmitting the assignment information to the new client.

16. The method as recited in claim 14 wherein the determining comprises:

transmitting the global region location information to a global data center for determination of the preferred deployment unit; and receiving the assignment information from the global data center.

17. The method as recited in claim 16 wherein the global data center comprises a global provisioning directory for hosting all known deployment units, and wherein the act of determining further comprises:

optionally obtaining the assignment information from a replica of the global provisioning directory rather than via the global data center.

18. The method as recited in claim 14 further comprising:

marking a global data center for a current client if a new deployment unit is known; and transmitting need-reassignment information to the current client, wherein the need-reassignment information causes the current client to re-provision.

\* \* \* \* \*